F. G. MOARD.
CONTROL APPARATUS.
APPLICATION FILED JULY 3, 1916.

1,333,626.

Patented Mar. 16, 1920.

WITNESSES:
R. J. Fitzgerald
W. C. McCoy.

INVENTOR
Ferdinand G. Moard.
BY
Wesley G. Carr
ATTORNEY

UNITED STATES PATENT OFFICE.

FERDINAND G. MOARD, OF TURTLE CREEK, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,333,626.

Specification of Letters Patent.   Patented Mar. 16, 1920.

Application filed July 3, 1916.   Serial No. 107,452.

*To all whom it may concern:*

Be it known that I, FERDINAND G. MOARD, a citizen of the United States, and a resident of Turtle Creek, in the county of Allegheny and State of Pennsylvania, have invented a new and useful Improvement in Control Apparatus, of which the following is a specification.

My invention relates to control apparatus and particularly to magnetically-actuated valves for controlling fluid under pressure.

One object of my invention is to provide a valve of the above-indicated class in which the actuating mechanism is disposed in a fluid-tight casing of particularly simple and durable construction.

Another object of my invention is to provide a casing having a plurality of fluid-tight compartments.

Heretofore, in magnet valves, and particularly in valves having a throttled exhaust, it has been proposed to provide various forms of fluid-tight seals for inclosing the moving parts of the valve. My invention provides a gasket that is interposed between the core of the energizing coil and the inclosing casing and thereby provides a magnet-valve casing having a plurality of fluid-tight compartments.

Figure 1:
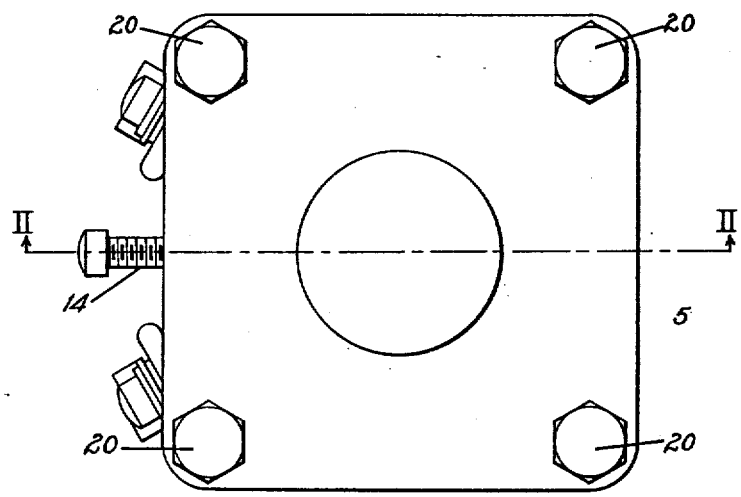
Figure 2:
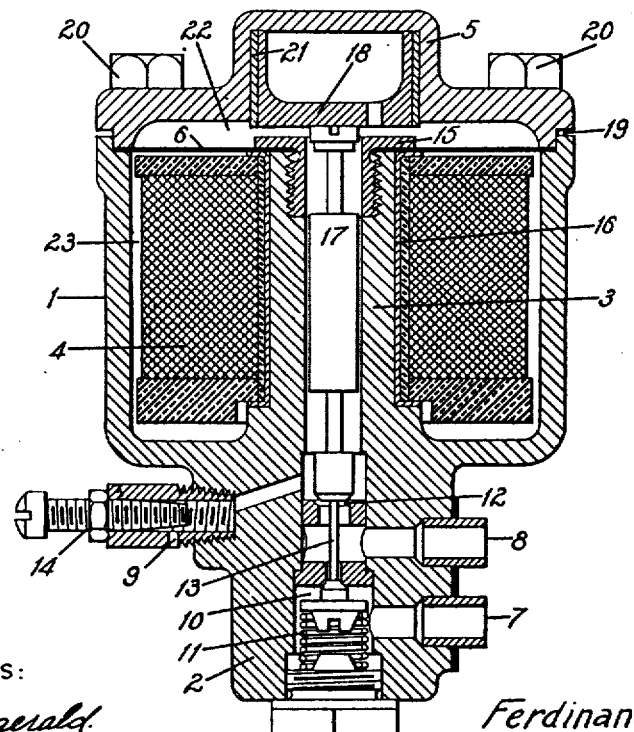

Figure 1 of the accompanying drawing is a top plan view of a magnet valve embodying my invention, and Fig. 2 is a sectional side-view on the line II—II of Fig. 1.

A preferred form of magnet valve shown in the drawing comprises a casing 1, which is preferably of magnetizable material, having a bottom portion that is provided with a valve mechanism 2 and a central portion which constitutes a core 3 for an energizing coil 4, a top 5 for the casing 1 and an improved form of sealing gasket 6 which is interposed between the cover member and the casing.

The bottom portion of the casing 1 is provided with a supply port 7, through which fluid, under pressure, is admitted to the device, a delivery port 8 through which fluid is directed to the device to be actuated thereby and an exhaust port 9 through which fluid from the device to be actuated is released into the atmosphere at a variable rate. The flow of fluid from the supply port 7 to the delivery port 8 is by way of a valve 10 which is normally biased to a closed position by a spring 11 in a manner to be hereinafter set forth. The flow of fluid from the delivery port 8 to the exhaust port 9 is by way of a valve 12 that is normally biased to an open position by the spring 11 and is operatively connected to the valve 10 by a shaft 13 in order that, when one valve is opened, the other valve may be closed. The exhaust port 9 is provided with a fluid-throttling device 14 which adjustably regulates the rate of escape of fluid through the port 9.

The upper portion of the casing 1 is recessed to receive the energizing coil 4. The hollow core 3 is integral with the casing 1 and is provided with a cap 15 which is in threaded engagement with the core 3 and has an over-hanging top portion that is adapted to secure the coil 4 in place, by crimping the ends of an interposed sleeve 16, and to clamp the gasket 6 to the core to form a fluid-tight joint therewith. A rod 17, the lower end of which constitutes a portion of the valve 12 and the upper end of which extends above the cap 15, is movably positioned within the hollow core 3 and is adapted to be actuated by an armature 18. The top 5 is provided with an annular flange 19 which is adapted to engage in a corresponding groove in the casing 1, and is secured to the casing 1 by a plurality of bolts 20. A non-magnetizable shell 21, which is disposed within a recess of the top 5, constitutes a guide for the armature 18, and insures a suitable bearing surface therefor. The insertion of a non-magnetic gap in the magnetic path also prevents the armature from sticking by reason of residual magnetism in the flux path.

The annular disk 6 is rigidly clamped between the casing 1 and the top 5 and between the core 3 and the cap 15. The joints with the casing and the core are fluid-tight and thereby provide an upper compartment 22 in which the movable parts of the valve are positioned and a coil-containing compartment 23 in which the energizing coil 4 is mounted.

A magnet valve of the form herein described is actuated by energizing the coil 4 which produces a magnetic flux in a path extending from the core 3 through the armature 18, the top 5 and the casing 1 to the core 3. The energization of the armature 18 causes the same to be attracted toward the cap 15 and, since the armature bears upon the rod 17, the movement of the armature opens the valve 10 by depressing the spring 11 and closes the valve 12, thus admitting fluid to the device to be actuated. The deënergization of the coil 4 causes the armature 15 to be immediately released, by reason of the interposed sleeve 21, and the valve 10 to be closed by the spring 11. This movement also establishes a connection from the delivery port 8 to the atmosphere through the exhaust port 9 and, since the fluid cannot escape through the hollow core 3 to the atmosphere, by reason of the sealing member 6, the rate of operation of the device to be actuated may be regulated by properly adjusting the throttle 14.

If it is desired to operate such a valve as I have herein described under water or to control some fluid other than dry air, the inclosed coil is effectively prevented from absorbing moisture or being damaged by fluid coming in contact with it by locating the coil in a fluid-tight compartment.

The sealing gasket 6 is preferably of a soft metal that will engage the clamping surfaces to form a fluid-tight joint but may be made of non-metallic material, such, for instance, as rubber or leather. It is desirable, however, to have the gasket 6 made of non-magnetizable material in order that a flux path may not be established from the core 3 directly to the casing 1.

Although I have described my invention in a simple and preferred form, it is capable of various modifications and I desire, therefore, that only such limitations shall be imposed as are indicated in the appended claims.

I claim as my invention:

1. In a magnet valve, the combination with an energizing coil, a hollow core for said coil comprising a plurality of parts, a casing for said coil comprising a plurality of parts, and means for clamping the parts of said casing together, of an annular gasket clamped between the members of said core and between the members of said casing.

2. In a magnet valve, the combination with an energizing coil, a core for said coil comprising a plurality of parts, a casing comprising a plurality of parts, and means for clamping the parts of said casing together, of a gasket interposed between the parts of said core and clamped between the parts of said casing.

3. In a magnet-valve, the combination with a coil, a magnetizable casing for said coil, a top for said casing, means for clamping said top to said casing, a magnetic core for said coil, and a cap for said core adapted to be secured thereto, of a gasket adapted to be interposed between said casing and said top.

4. In a magnet valve, the combination with an energizing coil, a casing for said coil, a top for said casing adapted to closely fit said casing, a hollow core member having the lower end thereof integral with said casing, and a hollow cap member having threaded engagement with said core, of a soft metallic washer interposed between said core and cap and extending radially over said coil.

5. In a magnet valve, the combination with a coil, a casing for said coil, a top for said casing, a core for said coil having one end secured to said casing and a cap secured to the other end of said core, of a relatively soft metallic gasket interposed between said core and said cap and between said casing and said top.

6. In a magnet valve, the combination with an energizing coil, a core for said coil, a cap for said core, a casing for said coil, and a top for said casing, of a gasket interposed between said core and cap and between said casing and top.

7. In a magnet valve, the combination with an energizing coil, a casing for said coil comprising a plurality of parts, means for clamping said parts together, a hollow core for said coil having one end secured to said casing and a cap in threaded engagement with the other end of said core, of a gasket interposed between the parts of said casing and said core and cap.

8. In a magnet valve, the combination with an energizing coil, a core for said coil comprising a plurality of separable parts, and a casing for said coil comprising a plurality of separable members, of a gasket interposed between the parts of said core and between the members of said casing.

9. In a magnet valve, the combination with an energizing coil, a casing for said coil comprising a plurality of parts, and means for clamping the parts of said casing together, of an annular gasket clamped between the parts of said casing.

10. In a magnet valve, the combination with an energizing coil, a hollow core for said coil, and a cap for said core, of a gasket interposed between said core and cap and adapted to form a substantially fluid-tight joint therewith.

11. In a magnet valve, the combination with an energizing coil, a casing for partially inclosing said coil, a top for said casing, and a hollow core for said coil having one end thereof in substantially fluid-tight engagement with said casing, of a gasket interposed between said core and said top to constitute a substantially fluid-tight inclosing compartment for said coil.

In testimony whereof, I have hereunto subscribed my name this 29 day of June 1916.

FERDINAND G. MOARD.